(No Model.) 2 Sheets—Sheet 1.

W. F. PARISH.
CIRCULAR SAW MILL.

No. 307,678. Patented Nov. 4, 1884.

Witnesses:
F. Burnham
G. S. Rafter

Inventor:
W. F. Parish
By L. H. Ginsabaugh
atty.

(No Model.)

W. F. PARISH.
CIRCULAR SAW MILL.

No. 307,678.  Patented Nov. 4, 1884.

2 Sheets—Sheet 2.

UNITED STATES PATENT OFFICE.

WILLIAM F. PARISH, OF ST. PAUL, MINNESOTA.

CIRCULAR-SAW MILL.

SPECIFICATION forming part of Letters Patent No. 307,678, dated November 4, 1884.

Application filed August 28, 1884. (No model.)

*To all whom it may concern:*

Be it known that I, WILLIAM F. PARISH, a citizen of the United States, residing at St. Paul, in the county of Ramsey and State of Minnesota, have invented certain new and useful Improvements in Circular-Saw Mills, of which the following is a specification, reference being had therein to the accompanying drawings.

My invention relates to improvements in circular-saw mills, the object of which is to hang the upper saw so that it will register with the kerf of the lower saw, and thus produce lumber of uniform thickness and smooth surface.

My invention therefore consists in mounting the upper saw back or to the rear of the lower saw, the lower edge of the upper saw being somewhat below the upper edge of the lower saw, so that the kerf of the lower saw will assist to steady and guide the upper saw.

My invention consists, further, in mounting the arbor or spindle to which the upper saw is secured in boxes or bearings, so that the saw and arbor will move endwise back and forth as free as possible from the strain of the belt.

My invention consists, further, in combining with the upper saw a self-adjusting guide, so that when properly set the upper saw will always register with the kerf of the lower saw.

Other novel features of my invention will be fully described hereinafter and pointed out in the claims.

Figure 1:
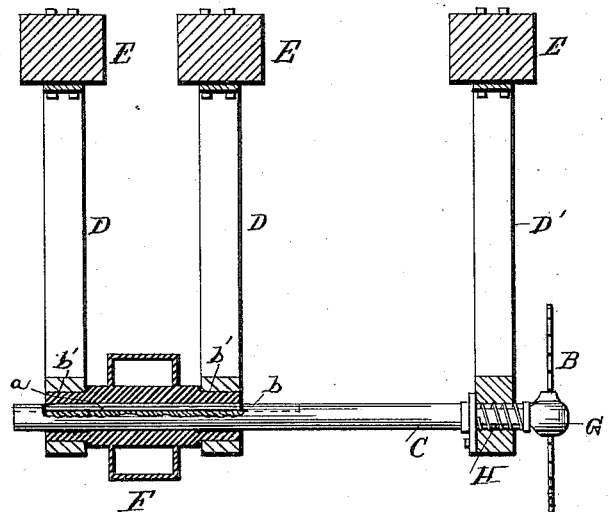
Figure 3:
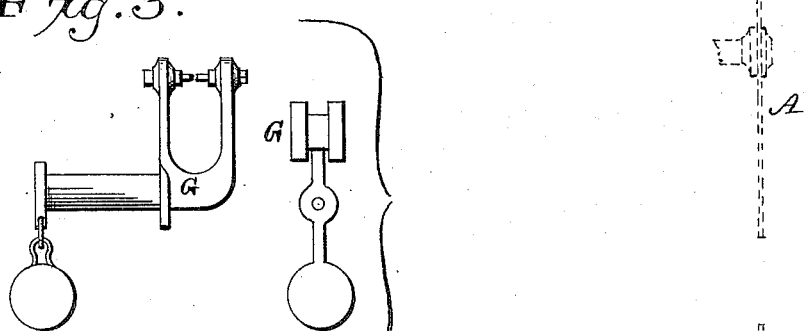
Figure 2:
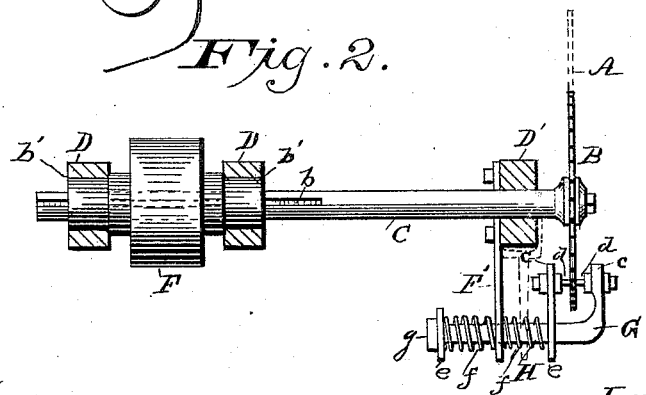
Figure 4:
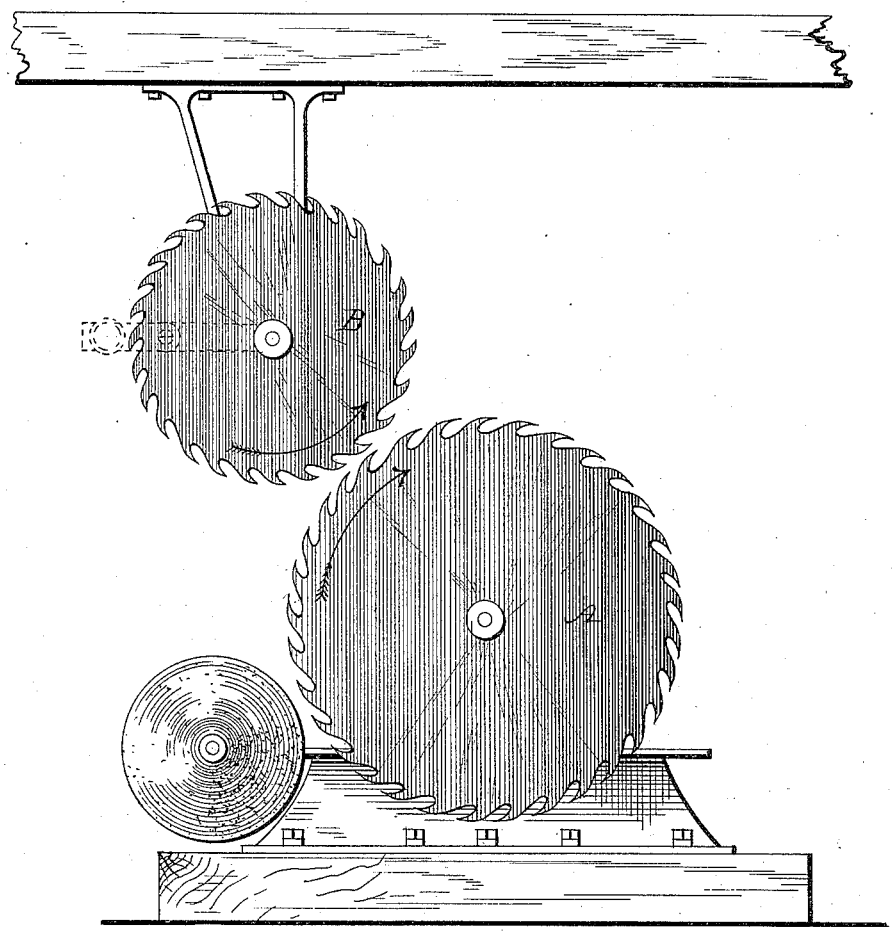

Referring to the drawings, Figure 1 is a vertical view, partly in section, showing the upper saw and bearings for its pulley and arbor, and also the driving-pulley. Fig. 2 is a top or plan view. Fig. 3 is a modification of my saw-guide in which a weight is used instead of a spring. Fig. 4 is a side elevation showing both saws in position.

A indicates the lower saw, mounted in suitable bearings in the usual manner, and adapted to be rotated in the direction indicated by the arrow.

B is the upper saw, secured to the arbor or axle C, said arbor being mounted at the saw-bearing end in a suitable bearing in the hanger, D', while the other end passes through and is supported by the hub of the pulley. The pulley is supported in the hangers D D, the hub of which is extended on each side, as will more fully appear, while the hangers may be suspended from timbers E E above the saws or project upward from the bed or frame of the machine, as is most desirable. The arbor C is a plain cylindrical shaft without collars, and so mounted in its bearings that it is free to move to and fro endwise within certain limits. F is the driving or band pulley, and is provided with a spline, *a*, which fits into a groove, *b*, formed in the shaft C. Two or more grooves may be formed in the arbor or shaft C, in which a corresponding number of splines on the hub of the pulley will mesh. The pulley F, as before intimated, is provided with a hub which extends out from each side of the center, so as to form journals *b' b'*, by which the pulley is supported in suitable bearings in the hangers D D, which enables it to withstand the strain of the driving-belt without buckling, the saw-shaft thus insuring at all times a steady and uniform motion of the saw. This construction permits the shaft C, with the saw B, to have a free endwise motion, while at the same time a rotary motion is imparted to it by means of the pulley. The object of the endwise movement of the arbor of the upper saw is to enable the saw to register with and be directed by the kerf made by the lower saw, the upper saw being so hung that its lower edge projects below the upper edge of the lower saw, as shown in Fig. 4, and consequently the lower edge of the upper saw travels in the kerf of the lower saw, thus enabling the operator to produce lumber or boards of uniform thickness throughout and with smooth and even surfaces.

F' is an arm secured to the bracket D', in the outer end of which is mounted the saw-guide G. The saw-guide is adjustably secured to the arm F', and is provided with two projections or arms, C C, which embrace the saw, suitable rubbers, *d*, being secured to the arms C. The inner end or shank of the saw-guide G is supported in the outer end of the arm F', said arm F' being secured at the other end to the hanger D'. The shank of the saw-guide is provided with suitable collars, *e*, against which and against the arm F' the spiral or strap springs impinge. The collar *e* on the outer end of the shank is movable, and is held in place by the screw-nut g, so that by turning the screw-nut the tension of the springs can be increased or diminished and the guide adjusted to meet the requirements of the saw. The arm which supports the guide may be made flexible, or, rather, in the form of a strap-spring, so that it will yield slightly to meet the requirements of the saw. In such a case the coiled or strap springs are dispensed with. In some cases I may secure the guide to a pivoted bar, said bar being provided with a weight, so that its normal condition is in a vertical position. Any deviation of the saw will be corrected by the weight, which acts in the same manner as the spring. Other devices for rendering the guide self-adjusting will readily suggest themselves to the skilled mechanic, and such I consider as modifications and are embraced in my present invention. The stem or shank H is of uniform diameter, so that it can play back and forth in the arm F', so that when the saw moves to one side or the other from its adjusted position the guide will gradually work or guide it back into its true position. The yielding guide is quite necessary, and when used in combination with the longitudinally-moving saw arbor or shaft I am enabled to saw lumber of extra width of uniform thickness. The saws A and B are so geared as to be driven in opposite directions, as indicated by the arrows. This enables the upper saw to partially enter the kerf of the lower saw, which will cause the saw to be centered and steadied as it approaches the wood, and the wood from the kerf of both saws is cut and thrown outward and away from each saw, thus preventing the chips or sawdust of one saw from coming in contact with the other saw to obstruct or choke its passage, while at the same time a straight and uniform cut is produced from one end of the log to the other without necessitating the edging off and consequent wasting of that portion of the board cut by the top saw, as is now the case.

Having thus described my invention, what I claim, and desire to secure by Letters Patent, is—

1. In a circular-saw mill, an upper laterally-moving saw, and a lower saw adapted to be driven in opposite directions, the lower edge of the upper saw projecting below and to the rear of the upper edge of the lower saw, whereby the kerf of the lower saw serves as a guide for the upper saw, as set forth.

2. In a circular-saw mill, a lower saw and an upper saw mounted in suitable bearings, and adapted to move in a longitudinal direction, in combination with a self-adjusting or flexible guide, as set forth.

In testimony whereof I affix my signature in presence of two witnesses.

WILLIAM F. PARISH.

Witnesses:
L. SCHLESINGER,
FRANK J. STERN.